United States Patent [19]

Godlewski

[11] Patent Number: 4,532,822
[45] Date of Patent: Aug. 6, 1985

[54] SHAFT AND GEAR ADJUSTER

[76] Inventor: Edward S. Godlewski, 129 S. Spruce, Wooddale, Ill. 60109

[21] Appl. No.: 422,872

[22] Filed: Sep. 24, 1982

[51] Int. Cl.³ .................. F16H 35/06; F16H 35/08; F16H 55/18; F16H 57/00
[52] U.S. Cl. ..................................... 74/397; 74/395; 74/409; 74/411
[58] Field of Search ............... 74/397, 395, 396, 409, 74/411; 474/112

[56] References Cited

U.S. PATENT DOCUMENTS

| | | | |
|---|---|---|---|
| 1,171,347 | 2/1916 | Morse | 74/397 |
| 1,426,173 | 8/1922 | Fuegel | 474/112 |
| 2,021,935 | 11/1935 | Griswold | 74/397 |
| 2,507,555 | 5/1950 | Berthiez | 74/397 |
| 2,549,241 | 4/1951 | Rorive | 74/397 |
| 4,004,478 | 1/1977 | Morgan | 74/397 |
| 4,051,916 | 10/1977 | Oda | 248/27.1 |

FOREIGN PATENT DOCUMENTS

| | | | |
|---|---|---|---|
| 874018 | 6/1942 | France | 74/397 |
| 12804 | of 1895 | United Kingdom | 474/112 |
| 743282 | 1/1956 | United Kingdom | 474/112 |

Primary Examiner—Leslie A. Braun
Assistant Examiner—Michael D. Bednarek
Attorney, Agent, or Firm—John J. Kowalik

[57] ABSTRACT

An adjustable mounting for a shaft on a thin metal support plate wherein a cylindrical lounting flange is punched out of the plate to form an opening, and a bearing is rotatably mounted within the opening. The bearing has a radial flange engaging the external side of the plate and has a threaded inner end extending beyond the inner end of the plate flange. A nut is threaded on the threaded end and has a bore telescoped over the plate flange. The inner end of the nut has an edge which is tightened against the internal side of the plate. The plate flange, the nut and the radial bearing flange rigidify the contiguous area of the plate to minimize deflection. A flat adjusting member lays against the outer side of the support plate and has a rectangular aperture with parallel side edges which mate with chordal edges on the radial flange of the bearing. Rotation of the adjusting member causes the bearing to rotate. The adjusting plate has a slot extending normal to the side edges and a screw extending therethrough, which prevents the plate from naturally moving in an arc and thus causes it to slide relative to the bearing.

5 Claims, 5 Drawing Figures

SHAFT AND GEAR ADJUSTER

BACKGROUND OF THE INVENTION

Various types of adjusting devices have been heretofore available for adjusting shafts and gears thereon for proper mating relationship. Such adjusting devices normally utilize a set screw adjustment wherein the support provides a bracket for mounting the set screw for moving the shaft laterally. This requires that the support for the bearing of the shaft has to be slotted, which adds to the cost and weakens the support which, if the support comprises a thin metal plate requires bracing in the cut out area.

SUMMARY OF THE INVENTION

This invention is directed to a novel, simplified and positive mechanism for adjusting a pair of spur gears into proper mating relationship and which will at the same time maintain the axes of these gears in parallelism.

The invention comprehends providing a novel eccentric bearing for one of the mounting shafts of a first gear of a pair of mating gears, said eccentric being rotatable about an axis parallel to the axis of the shaft mounting a second gear and the axis of the eccentric being parallel with the aforementioned axes.

An object of the invention is to provide a novel, easily manipulated securing assembly for locking the parts in adjusted position.

These and other objects of the invention will become more apparent from the specification and the drawings, wherein.

DESCRIPTION OF THE INVENTION

Figure 1:
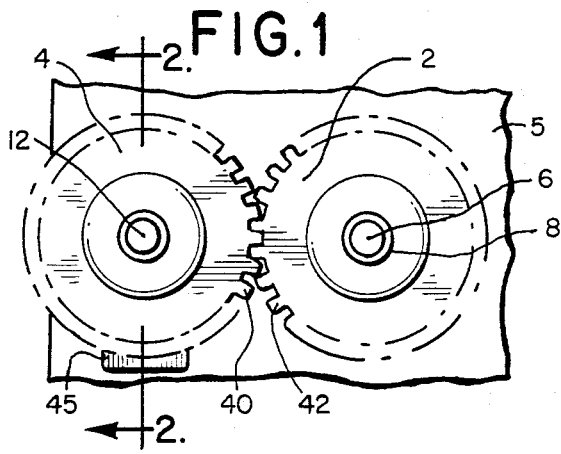
FIG. 1 is a side elevational view of a pair of gears mounted on a support and incorporating the invention.
Figure 4:
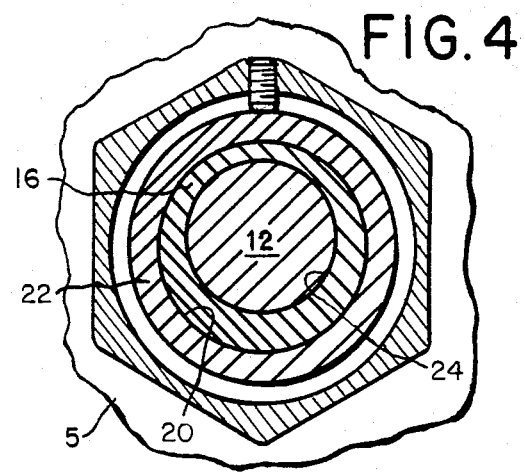
FIG. 4 is a sectional view taken on line 4—4 of FIG. 2.
Figure 2:
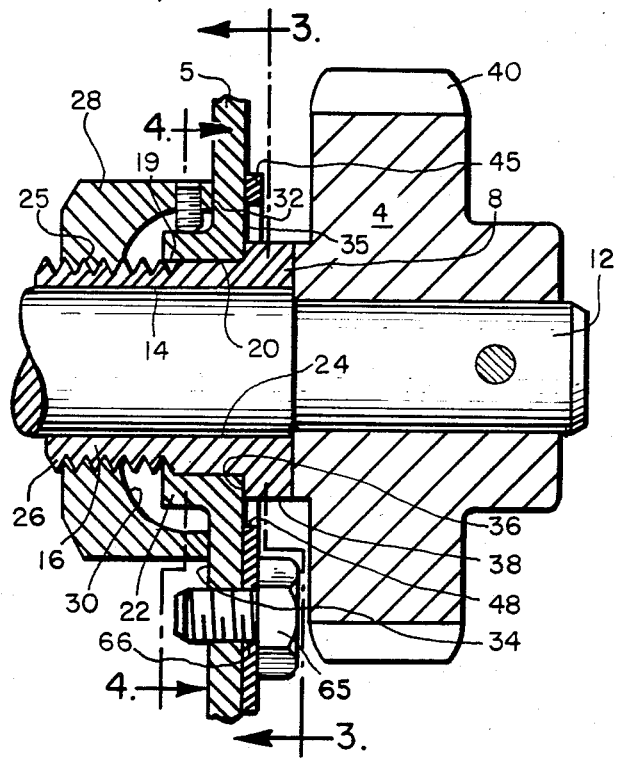
FIG. 2 is an enlarged sectional view taken substantially on line 2—2 of FIG. 1.
Figure 3:
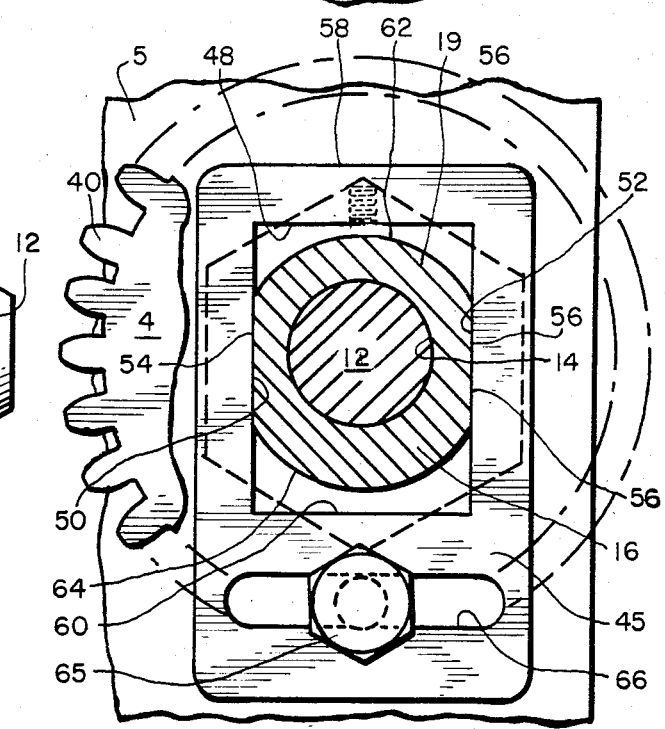
FIG. 3 is a sectional view taken substantially on line 3—3 of FIG. 2.
Figure 5:
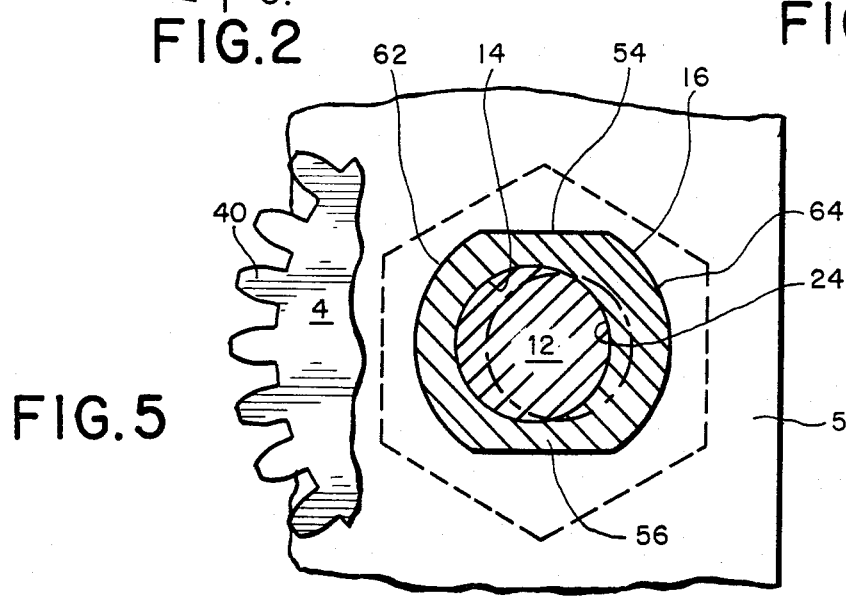
FIG. 5 is a sectional view similar to FIG. 3 showing the parts in maximum adjusted position, the locking plate being removed for clarity.

In the drawings there are illustrated a pair of gears 2 and 4 in meshing relation and mounted on a thin sheet metal support plate 5. Gear 2 is mounted on shaft 6 which is journaled in a bearing 8 which is carried by the plate 5 and gear 4 is similarly mounted on a shaft 12 which is journaled in a bore 14 in a bearing 16. The bearing 16 has a cylindrical outer surface 19 which fits into a complementary cylindrical surface 20 formed in a flange 22 which is upset from the metal of the support plate. The axes of the surfaces 19 and 20 and the axis of the shaft 6 are essentially parallel.

The bearing 16 has the cylindrical bore 14 through which the shaft 12 extends. A thread 25 is provided on the outer side of the bearing 16 on the inner end portion thereof, which extends beyond the inner edge of the mounting flange 22, and a nut is threaded thereon. The nut has a cavity 30 formed in one end into which the flange projects. The nut has a face 32 at one end, which upon tightening of the nut, bears against the inner side 34 of the support plate while the outer side 35 of the plate is engaged by the back side 36 of a radial flange 38 on the outer side of the bearing 16.

The axis of the bore 14 is eccentric with respect to the cylindrical outer surface 19 and the mating surface 20 whereby upon rotation of the bearing 16, the shafts and thus the gears mounted thereon are relatively moved toward each other or apart to obtain a proper mating relationship between the teeth 40,42.

A locking member 45 is provided to hold the bearing 16 in adjusted position. The member 45 is provided to hold the bearing 16 in adjusted position. The locking member comprises a thin sheet metal plate which is elongated and has a rectangular opening 48 formed adjacent to one end and elongated lengthwise of the member 45. The opening is defined by parallel side edges 50,52 which fit closely against flat sides 54,56 formed on the edge of the bearing flange 38. The ends of the slot 58,60 are normally spaced from the opposing arcuate sectors 62,64 of the flange 38.

A locking screw is extended through a slot 66 formed in the member 45 adjacent to one end, and is threaded or secured to the mounting support plate. The slot is elongated normal to the side edges 50,52 of the securing plate slot 48 and as the member 45 is swung about the axis of the surface 19 relative sliding movement occurs between the side edges 50,52 and 54,56 while the bearing 16 rotates. The eccentricity of the bore 14 swings the shaft 12 toward or away with respect to the shaft 6 and thus the gears 2 and 4 are set closer or farther apart to otain proper gear meshing.

A novel, simple and effective means has been provided for mounting and adjusting gear teeth meshing relationships to compensate for the inaccuracies generated by the punched mounting holes for the shaft bearings in the sheet metal. Obviously precise relationships can be effected at substantial cost using this metal. This invention permits relatively inexpensive manufacture within acceptable tolerances which are compensated by the invention. Furthermore, the invention includes flanging about the shaft openings which strengthens the side sheets.

I claim:

1. An adjuster for meshing gears mounted on generally parallel shafts carried in cylindrical bearings extending through complementary cylindrical openings in a support plate, comprising:
   an eccentric bore in at least one of said bearings through which one of said shafts is journaled,
   means for rotating said one of said bearings to shift the associated shaft to position the gears in proper meshing relationship,
   wherein said means for rotating comprises an elongated member having a first slot with essentially parallel side edges and said one of said bearings having diametrically opposite flat side edge portions extending chordally thereof in close fitting relation between the side edges of the slot and relatively slidable therewith as said member is rotated while restrained from rotary movement with respect to said one bearing, and wherein said member has a second slot elongated transversely of said side edges, and a securing means extending through said second slot for holding said member in secured rotatably displaced positions; said first slot being longer than the diameter of the bearing.

2. The invention according to claim 1 and said opening in said support plate being defined by cylindrical bearing-encompassing flanges punched out from the plate to form respective openings, said cylindrical flanges imparting strength and rigidity to the plate and providing extensive bearing support.

3. The invention according to claim 2 and said one of said bearings comprising a threaded inner end extending beyond the inner end of its encompassing flange, and a securing nut having an enlarged bore at one end receiving said last-mentioned flange therein and having an edge in engagement with an adjacent side of said plate and having adjacent to its other end threads therein threaded upon said threaded inner end of said one bearing.

4. A shaft adjusting assembly for mounting in an opening in a thin metal support plate, said plate having inner and outer sides, said plate being formed with an opening by having the metal removed from the opening and the removed metal being formed into a cylindrical sleeve extending normal to said plate from said inner side thereof and terminating in a free edge, a cylindrical bearing fitted within said sleeve and having a radial flange at one end abutting against the outer side of the plate and having a threaded end portion extending beyond the free edge of said sleeve, a nut having a first portion telescoped over said sleeve and having an edge engageable with the inner side of said plate, said nut having an end portion remote from said edge in threaded engagement with said threaded end portion of said bearing for tightening engagement at said edge with said inner side of said plate and clamping the plate with the radial flange of the bearing, said bearing having a shaft-mounting bore eccentric to said cylindrical outer surfaces of the bearing and the sleeve, said bearing being rotatable within said sleeve for moving said bore eccentric to adjusting position, and means associated with the flange shiftable transaxially of said bearing attendant to rotation of the bearing for adjusting and maintaining said bearing in adjusted position, and said means for adjusting the bearing comprising an elongated adjusting member and said bearing and member having relatively slidable engaging surfaces extending chordally of the bearing, and said adjusting member slidable on said surfaces transversely of said bearing attendant to rotation of the member and bearing.

5. The invention according to claim 4 and said elongated adjusting member having a slot extending transversely to said chordal surfaces, and a securing screw extending through the slot and attached to said support plate.

* * * * *